United States Patent [19]
Hisano et al.

[11] Patent Number: 6,102,825
[45] Date of Patent: Aug. 15, 2000

[54] CONTROL SYSTEM FOR AUTOMATIC TRANSMISSION

[75] Inventors: Takayuki Hisano; Masahiro Hayabuchi; Satoru Kasuya, all of Anjo; Tatsuya Iida, Takefu, all of Japan

[73] Assignee: Aisin AW Co., Ltd., Anjo, Japan

[21] Appl. No.: 09/268,709

[22] Filed: Mar. 16, 1999

[30] Foreign Application Priority Data

Mar. 17, 1998 [JP] Japan .................................. 10-089286

[51] Int. Cl.⁷ .................................................. F16H 61/06
[52] U.S. Cl. .......................... 475/118; 475/120; 475/127
[58] Field of Search .................................. 475/116, 118, 475/120, 127

[56] References Cited

U.S. PATENT DOCUMENTS

| | | | |
|---|---|---|---|
| 4,446,759 | 5/1984 | McCrary | 475/120 |
| 4,790,418 | 12/1988 | Brown et al. | 475/120 |
| 5,020,393 | 6/1991 | Kuwayama et al. | 477/153 |
| 5,634,869 | 6/1997 | Mikami et al. | 475/120 |
| 5,836,852 | 11/1998 | Tsutsui et al. | 477/118 |
| 5,935,041 | 8/1999 | Tsukamoto et al. | 477/195 |

FOREIGN PATENT DOCUMENTS 63-266258  11/1988  Japan .

*Primary Examiner*—Sherry L. Estremsky
*Attorney, Agent, or Firm*—Oliff & Berridge, PLC

[57] ABSTRACT

A rotational direction of a rotational element at a high speed gear stage is different from a operational direction of a reaction torque at a low speed gear stage. The rotation by the reaction torque at the low speed gear stage is stopped with a self-energizing operation of a band brake operated by a hydraulic servo. A waiting pressure, which is lower for a predetermined amount than a engagement pressure at the self-energizing operation, and with which a basis of a racing amount occurs after a synchronizing point, is applied to the hydraulic servo until the synchronization is determined. The waiting pressure increases to the engagement pressure after determining the synchronization so that the rotational element is stopped gradually as preventing a long shift time.

16 Claims, 13 Drawing Sheets

|      | C-1 | C-2 | B-1 | B-2 | B-3 | B-R |
|------|-----|-----|-----|-----|-----|-----|
| P    | O   |     |     |     |     |     |
| REV  | O   |     |     |     |     | O   |
| N    | O   |     |     |     |     |     |
| 1ST  | O   |     |     |     | O   |     |
| 2ND  |     | O   |     |     | O   |     |
| 3RD  | O   | O   |     |     |     |     |
| 4TH  |     | O   | O   |     |     |     |
| 5TH  |     | O   |     | O   |     |     |

CONTROL SYSTEM FOR AUTOMATIC TRANSMISSION

BACKGROUND OF THE INVENTION

1. Field of the Invention

The invention relates to a control system for an automatic transmission. More specifically, it relates to a control system for reducing a shift shock during a down shift.

2. Description of Related Art

An automatic transmission performs gear shift by changing power transmission lines through planetary gear units in a gear train. Frictional engagement elements connected to a particular rotational element of the planetary gear units are properly engaged/disengaged by hydraulic servos so that the power transmission lines are changed. An electronic control system controls a hydraulic control system. The hydraulic control system controls the hydraulic servos.

In this automatic transmission, when the downshift from a high speed gear stage to a low speed gear stage is performed, a frictional engagement element engaged in the high speed gear stage is disengaged and a frictional engagement element engaged in the low speed gear stage is engaged. At that time, when the timing between the disengagement and the engagement is improper, an engine racing or a tie-up shock occur. Japanese patent application laying-open No. 63-266258 describes a feedback control to prevent engine racing and tie-up shock. In this control, when the aforementioned down shift is performed, an input rotation speed of the automatic transmission is changed smoothly at around the synchronizing rotation for the low speed gear stage, then it takes the rotation change of the rotational member into a target rotation change by the feedback control to prevent engine racing and tie-up shock.

In an automatic transmission, the frictional engagement elements are controlled through the hydraulic control system. Therefore, even when the electronic control system controls electrically and minutely, it is difficult to perform proper follow-up control because of a limitation of hydraulic responsiveness and a dispersion of mechanical character of the frictional engagement elements. Especially, in the aforementioned art, the rotation of the rotational member is controlled to achieve the target rotation change set based on the rotation in the shift transition. Therefore, a complicated control is needed.

SUMMARY OF THE INVENTION

In view of the above problems associated with the related art, an object of the invention is to provide a control system for an automatic transmission which prevents engine racing and tie-up shock during a downshift, and in which an effect of hydraulic responsiveness is reduced with a simple structure.

Another object of the invention is to prevent a change of shift character caused by a dispersion of character of each transmission.

Another object of the invention is to achieve a proper shift character corresponding to an operation state of an automatic transmission with a simple control.

Another object of the invention is to prevent a shock caused by steeply engaging the frictional engagement element and an extension of a shift time during a downshift irrespective of a transmission torque of an automatic transmission.

Another object of the invention is to reduce a shift shock based on a difference of vehicle speeds during a downshift.

In order to achieve the aforementioned objects, a control system for an automatic transmission of the invention comprises a frictional engagement element which is engaged to establish a high speed gear stage, a rotational element which is engaged to establish a low speed gear stage and of which the rotational direction at establishing the high speed gear stage is opposite to an operational direction of a reaction torque to the rotational element at establishing the low speed gear stage, a brake that stops the rotational element from rotating, and a control unit which controls the hydraulic pressures for the frictional engagement element and the brake.

The brake is structured from a band brake which has a difference of the engagement force based on a self-energizing operation and a de-energizing operation. The band brake is set so that the direction of the self-energizing operation is the same with an operational direction of a reaction torque from the rotational element at establishing the low speed gear stage. Further, the band brake is set in order to have a region in which a hydraulic pressure, which is needed to engage the rotational element when the low speed gear stage is established, is lower than a hydraulic pressure, which is needed to engage the rotational element when the high speed gear stage is established.

The control unit comprises a disengaging device which disengages the frictional engagement element at the downshift from the high speed gear stage to the low speed gear stage, a synchronization determining device which determines that the input rotation of the automatic transmission is synchronized with the rotation at the low speed gear stage, a constant pressure maintaining device which maintains the hydraulic pressure applied to the hydraulic servo of the band brake with a waiting pressure, which is lower for a predetermined amount than a pressure stopping the rotation of the rotational element in the direction of the self-energizing operation and with which the input rotation is raced for a basic racing amount after a synchronizing point, until the synchronization is determined by the synchronization determining device, and a pressure increasing device which increases the hydraulic pressure applied to the hydraulic servo from the waiting pressure in order to stop the rotational element from rotating after determining the synchronization.

The control unit stores a premeditated waiting pressure value to provide the basic racing amount, and comprises a maximum racing amount detecting device which detects a maximum racing amount of the input rotation speed based on the input rotation speed of the automatic transmission. The control unit comprises a learning device which renews the stored waiting pressure value in order to achieve the basic racing amount by comparing the basic racing amount with the maximum racing amount after the end of the downshift.

The multiple waiting pressure values are stored in the control unit corresponding to the throttle opening of the engine and the output rotation speed as parameters, and the waiting pressure value is selected corresponding to the throttle opening and the output rotation speed at the shift start.

The pressure increasing device increases the hydraulic pressure with a predetermined rate, which increases when the throttle opening of the engine increases, after determining the synchronization.

The pressure increasing device increases the hydraulic pressure at a predetermined rate and controls the hydraulic pressure in order that the input rotation speed changes at a target rate, which reduces when the output rotation speed of the automatic transmission reduces.

According to the invention, the rotation of the rotational element reduces to synchronize with the rotation of the rotational element at the low speed gear stage. That is, the rotation of the rotational element reduces to stop. In this case, the de-energizing operation occurs at the band brake. Therefore, the rotational element is not stopped from rotating by the band brake, because the engagement force occurred by the application of the aforementioned hydraulic pressure is small. After that, when the rotational element is stopped from rotating and then the reverse rotation of the rotational element is started, the self-energizing operation occurs. Therefore, the engagement force of the band brake steeply increases to stop the rotational element from rotating.

In this case, the hydraulic pressure applied to the hydraulic servo of the band brake is the waiting pressure, which is lower for the predetermined amount than the hydraulic pressure to maintain the stop of the rotation of the rotational element. Therefore, the rotational element is not steeply stopped, that is, the rotation of the rotational element changes gradually.

Then, after determining the synchronization, the hydraulic pressure increases to stop the rotational element from rotating, and then the shift is ended. Therefore, the responsibility of the hydraulic pressure is not made to be a problem, because the characteristic of the band brake changes and the engagement force increases corresponding to the rotational state of the rotational element by setting the hydraulic pressure as above. That is, a control to change the hydraulic pressure is not needed. Further, the rotation of the rotational element changes gradually at around the synchronizing rotation without a feedback control performed based on the rotation speed before the synchronization. Therefore, large engine racing and large tie-up shock are prevented with a simple control.

Even when each automatic transmission has dispersion or the band brake and the operational fluid of the automatic transmission deteriorate with age, the racing amount is always controlled properly to reduce shift shock because the waiting pressure value, with which the basic racing amount of the rotational element is determined, is renewed based on the actual maximum racing amount.

It is preferable that the waiting pressure is set based on the input torque and the inertia torque of the transmission at the shift end to reduce the shift shock. In this case, a complicated calculation will be needed to exactly calculate these torque values. In the invention, the multiple waiting pressure values are stored based on the throttle opening of the engine and the output rotation speed of the automatic transmission. Therefore, the waiting pressure corresponds to the input torque based on the throttle opening and the output rotation speed, and to the inertia torque based on the output rotation speed. As a result, the waiting pressure is made to be proper with a simple method.

The steep engagement at the low throttle opening and the extension of the shift time at the high throttle opening are prevented by increasing the hydraulic pressure at the predetermined rate, which increases when the throttle opening increases, after determining the synchronization.

A rate of the turbine rotation maximum racing amount to the whole rotation change amount in the shift in the low vehicle speed is higher than the case of the high vehicle speed. Therefore, a steep rotation change to the whole rotation change in the shift is prevented. Then, a shift shock is more certainly prevented by setting the gradient to reduce when the output rotation speed reduces.

BRIEF DESCRIPTION OF THE DRAWINGS

The invention will be described in conjunction with the following drawings in which like features are designated with like reference characters, and wherein.

DETAILED DESCRIPTION OF PREFERRED EMBODIMENTS

The invention will become more apparent from the detailed description of preferred embodiments with reference to the accompanying drawings.

Figure 2:
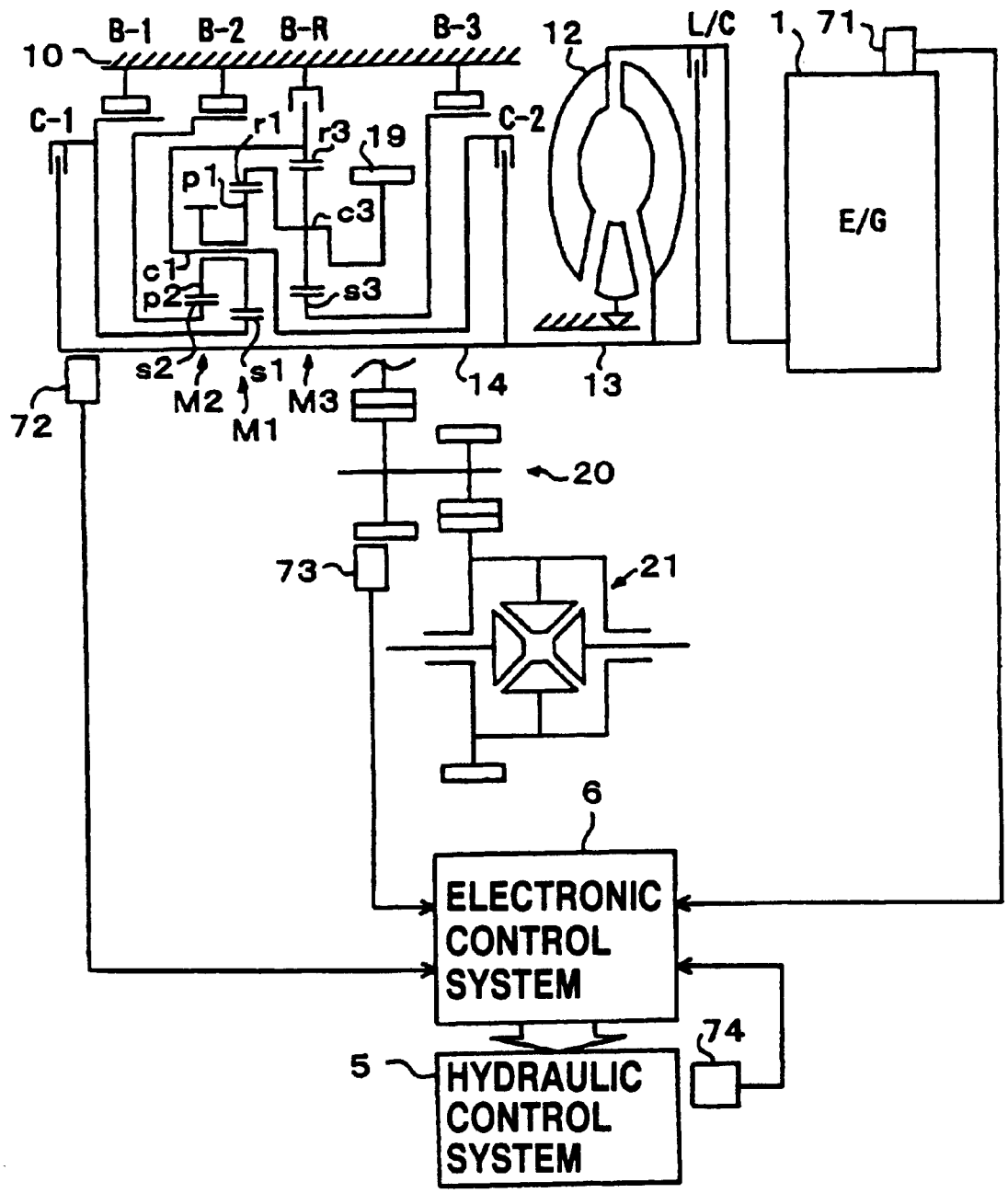
FIG. 2 is a system structuring diagram showing the entire structure of an automatic transmission provided with the shift mechanism of the invention, which is shown schematically.

FIG. 2 shows an automatic transmission having a control system of the invention. The structures of the automatic transmission are described below.

The automatic transmission comprises a torque converter 12 having a lock-up clutch L/C and interlocking to a vehicular engine E/G, a shift mechanism having three planetary gear sets M1, M2, M3 that shift the output from the torque converter 12 to five forward speeds and one backward speed, and differential unit 21 interlocking through a counter gear 20, which is also a speed reducing mechanism, to the shift mechanism, and transmitting the reduced output to left and right wheels of the vehicle.

In the shift mechanism of the automatic transmission, pinion gears p1 and p2, which have different diameters each other, of the gear sets M1 and M2, are directly connected each other, a ring gear r1 of the gear set M1 is connected to a carrier c3 of the gear set M3, a ring gear r3 of the gear set M3 is connected to a carrier c1 of the gear set M1, and a sun gear s1 and a carrier c1 of the gear set M1 are input members and connected through clutches C-1 and C-2, respectively, to an input shaft 14.

The input shaft 14 is interlocked to a turbine shaft 13 of the torque converter 12. The ring gear r1 and carrier c3 interlocking each other are interlocked to an output gear 19. The sun gear s1 of the gear set M1 is able to be engaged through a brake B-1 with a transmission case 10. The sun gear s2 of the gear set M2 is able to be engaged through a brake B-2 with the transmission case 10. The sun gear s3 of the gear set M3 is able to be engaged through a brake B-3 with the transmission case 10. The ring gear r3 interlocking to the carrier c1 is able to be engaged through a brake B-R with the transmission case 10. The output gear 19, as an output member, is interlocked through the counter gear 20 to the differential unit 21. The brakes, except for the brake B-R, are band brakes. The brake B-R is a multiple disc clutch. The hydraulic servos for the brakes are not shown in the figure.

Figures 3, 4:
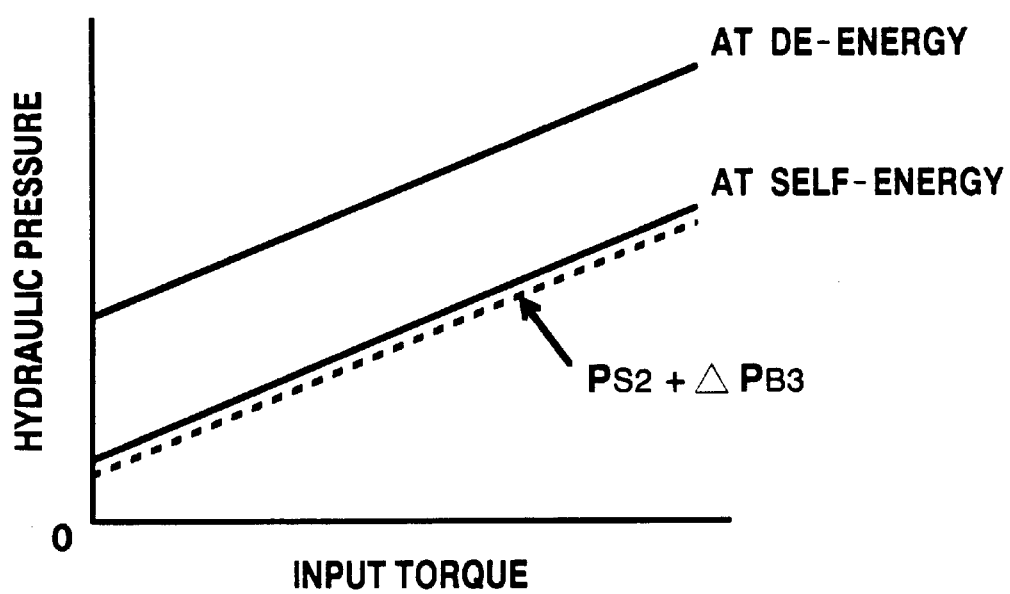
FIG. 3 is an operation diagram of the automatic transmission.
FIG. 4 is a chart showing a needed engagement force of a brake of the automatic transmission to establish a low speed gear stage.

The automatic transmission thus structured establishes each gear stage by selectively engaging and disengaging the clutches and the brakes, as shown in FIG. 3. In FIG. 3, circles constitute engagement. The clutches and the brakes are engaged and disengaged by applying/draining hydraulic pressures to/from the hydraulic servos according to the clutches and the brakes based on a control by an electronic control system 6 and a hydraulic control system 5.

The first gear stage is established by engaging the clutch C-1 and the brake B-3. In this case, the rotation from the input shaft 14 is transmitted through the clutch C-1 to the sun gear si, then outputted as the rotation of the carrier c3, which is the most reduced rotation by engaging the brake B-3 that stops the sun gear s3 from rotating, to the output gear 19. The second gear stage is established by engaging the clutch C-2 and the brake B-3. In this case, the rotation from the input shaft 14 is transmitted through the clutch C-2 and the carrier c1 to the ring gear r3, then outputted as the differential rotation of the carrier c3, which serves as a reaction element reacting to the sun gear s3 stopped from rotating by engaging the brake B-3, to the output gear 19. The third gear stage is established by the directly connecting state of the planetary gear set M1 achieved by engaging clutches C-1 and C-2. In this case, the rotation from the input shaft 14 is outputted as the rotation of the carrier c3 to the output gear 19.

The fourth gear stage and above of the transmission operate as an overdrive. The fourth gear stage is established by engaging the clutch C-2 and engaging the brake B-1 stopping the sun gear s1 from rotating. In this case, the rotation from the input shaft 14 is transmitted to the output gear 19 through the carrier c3 as the rotation of the ring gear r1, which is accelerated by the rotation of the pinion gears p1 with respect to the rotation of the carrier c1. The fifth gear stage is established by engaging the clutch C-2 and the brake B-2. In this case, the rotation from the input shaft 14 is transmitted to the output gear 19 through the carrier c3 as the rotation of the ring gear r1, which is additionally accelerated by the rotation of the small-diameter pinion gear p2, reacting the sun gear s2 having a larger diameter than the sun gear s1, with respect to the rotation of the carrier c1.

The reverse gear stage is established by engaging the clutch C-1 and the brake B-R. In this case, the rotation from the input shaft 14 is transmitted through the clutch C-1 to the sun gear s1, the rotation of the carrier c1 is stopped by engaging the ring gear r3 with the case 10 due to the engagement of the brake B-R, and the reverse rotation of the ring gear r1, which is decelerated by the rotation of the pinion gear p1, is outputted through the carrier c3 to the output gear 19.

In the automatic transmission thus structured, the brake B-2 is the frictional engagement element which is engaged to establish the high speed gear stage, the sun gear s3 is the rotational element which is stopped from rotating to establish the low speed gear stage, and the brake B-3 is the brake to stop the rotation of the sun gear s3. The control system controlling the hydraulic pressure to the hydraulic servos of the brakes B-2 and B-3 is structured as a circuit within the hydraulic control system 5 and a program stored in the electronic control system 6 controlling the circuit with electric signals.

Figure 1:
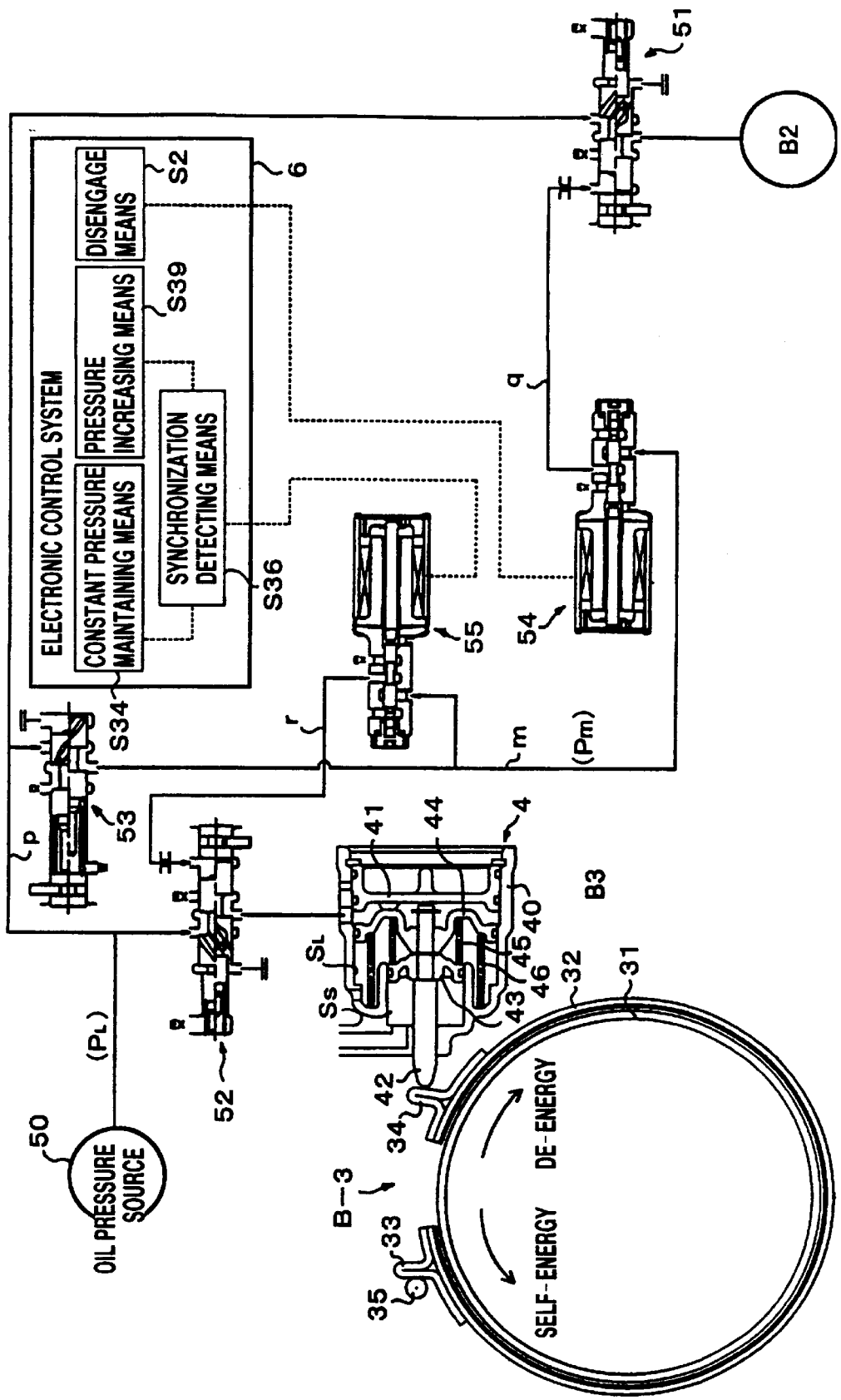
FIG. 1 is a circuit diagram showing a first embodiment of the control system for an automatic transmission of the invention.

As shown in FIG. 1 in detail, the brake B-3 comprises a drum 31, a band 32, and a hydraulic servo 4. The drum 31 is interlocked to the sun gear s3. The band 32 comprises brackets 33 and 34 at each end on the outer periphery of the band 32. The anchor side bracket 33 is attached to an anchor pin 35 which is fixed to the case 10. An apply side bracket 34, on the pressure application side, is attached to the end of a piston rod 42 of the hydraulic servo 4. The elasticity of the band 32 in a direction for opening, i.e., toward the hydraulic servo 4, biases the bracket 34 to the piston rod 42. Because of the characteristics of the mechanism of the brake B-3, at the engagement of the brake B-3, when the drum 31 receives a counterclockwise torque as shown in the FIG. 1, the frictional force that occurs by engaging the band 32 with the drum 31 acts on the band 32 in a direction to further tighten the band 32. Therefore, a selfenergizing (referred to as self-energy hereafter), which increases the brake engaging forces, occurs. When the drum 31 receives a clockwise torque, the frictional force that occurs by engaging the band 32 with the drum 31 acts on the band 32 in a direction to release the band 32. Therefore, a de-energizing (referred to as de-energy hereafter), which reduces the brake engaging forces, occurs. As a result, the engagement forces of the brake B-3 are different based upon the direction of the reacting torque applied on the sun gear s3.

The hydraulic servo 4 of the brake B-3 comprises a servo cylinder 40 having cylinder bores $S_L$, $S_S$ which have different diameters, a large diameter piston 44 slidably inserted in the large bore $S_L$, a small diameter piston 43 slidably inserted in the small bore $S_S$, a rod 42 inserted through both of the pistons 43 and 44 and always seated against or in contact with the small diameter piston 43, a separator spring 45 and a return spring 46 which are formed from compressed coil springs having different diameters, and a lid 41 covering an opening in the end of the large bore $S_L$. The rod 42 fixed against the small diameter piston 43 slidably protrudes through an end wall on the small bore $S_S$ side of the servo cylinder 40 and is attached to the bracket 34 of the band 32. The large diameter piston 44 is slidably retained by the rod 42. The separator spring 45 having a smaller diameter than the return spring 46 is arranged with a predetermined load setting between the small diameter piston 43 and the large diameter piston 44. The return spring 46 having a larger diameter than the separator spring 45 is arranged with a predetermined load setting between the end wall of the servo cylinder 40 and the large diameter piston 44.

The hydraulic control system 5 controlling the hydraulic servo 4 comprises a hydraulic pressure source 50 having a pump as a main body for the line pressure $P_L$, a B-2 control valve 51 connected through a line pressure hydraulic path p to the hydraulic pressure source 50, modulating the line pressure $P_L$ and outputting the modulated pressure to the hydraulic servo of the brake B-2, a B-3 control valve 52 connected to the line pressure hydraulic path p, modulating the line pressure $P_L$ and outputting the modulated pressure to the hydraulic servo 4, a solenoid modulator valve 53 connecting to the line pressure hydraulic path p, reducing the line pressure $P_L$ and outputting the reduced pressure to a modulator pressure hydraulic path m, a linear solenoid valve 54 outputting a solenoid signal pressure, which is based on the modulator pressure Pm reduced at the solenoid modulator valve 53, through a hydraulic path q to the B-2 control valve 51, and a linear solenoid valve 55 outputting a solenoid signal pressure, which is based on the modulator pressure Pm reduced at the solenoid modulator valve 53, through a hydraulic path r to the B-3 control valve 52.

The electronic control system 6 controlling the linear solenoid valves 54 and 55 are connected to the solenoids of the both valves. Further, as shown in FIG. 2, the electronic control system 6 is connected to a throttle opening sensor 71, a turbine rotation speed sensor 72, output rotation speed sensor 73, and an automatic transmission fluid (ATF) temperature sensor 74. The throttle opening sensor 71 is used to determine the shift and to select a map discussed below. The turbine rotation speed sensor 72 is used to detect the transmission input rotation speed to determine the shift start and the synchronization. The output rotation speed sensor 73 is used to detect the vehicle speed for selecting a map data. The ATF temperature sensor 74 is used to select the map.

The band brake B-3 is set to have a region in which a pressure, which is needed to engage the brake drum 31 when the brake drum 31 interlocked to the sun gear s3 rotates in the direction of the reacting force operated to the brake drum 31 (negative direction) at the second gear stage, is lower than a pressure, which is needed to engage the brake drum 31 when the brake drum 31 rotates in the direction of the rotation at the fifth gear stage (positive direction). That is, the de-energy occurs in the band brake B-3 when the brake drum 31 rotates in the positive direction, and the self-energy occurs in the band brake B-3 when the brake drum 31 rotates in the negative direction or when the brake drum 31 is in a stopping state and the torque having the negative direction is operated.

In detail, when the fifth gear stage is established, the rotation, which having the positive direction, inputted through the clutch C-2 to the carrier c1 is accelerated by stopping the sun gear s2 from rotating and outputted from the ring gear r1. Then, the rotation from the ring gear r1 is outputted through the carrier c3 to the output gear 19. In this case, the sun gear s3 rotates in the positive direction because the ring gear r3 rotates with the input rotation the same as the carrier c1 and the carrier c3 rotates with the accelerated rotation, which is higher than the input rotation, the same as the ring gear r1. Therefore, the brake drum 31 rotates in the positive direction. When the second gear stage is established, the rotation inputted through the clutch C-2 and the carrier c1 to the ring gear r3 is decelerated by stopping sun gear s3 from rotating and outputted from the carrier c3 to the output gear 19. In this case, the sun gear s3 receives the reaction force having the negative direction. Therefore, the brake drum 31 receives this reaction force having the negative direction.

The band brake B-3 has the aforementioned region when the output shaft is driven by the drive torque from the engine, that is, when the vehicle is in a power on state in which an accelerator pedal is depressed, and when the accelerator pedal is released, the vehicle is driven with a rather low speed and the engine rotates with less rotation speed than the idle rotation. The band brake B-3 does not have the aforementioned region when the engine is driven by the drive torque from the output shaft, that is, when the vehicle is in a coast state, because the direction of the reaction force reacting to the brake drum 31 changes to the positive direction. Therefore, this invention is applied in the case in which the output shaft is driven by the drive torque from the engine.

Figure 10:
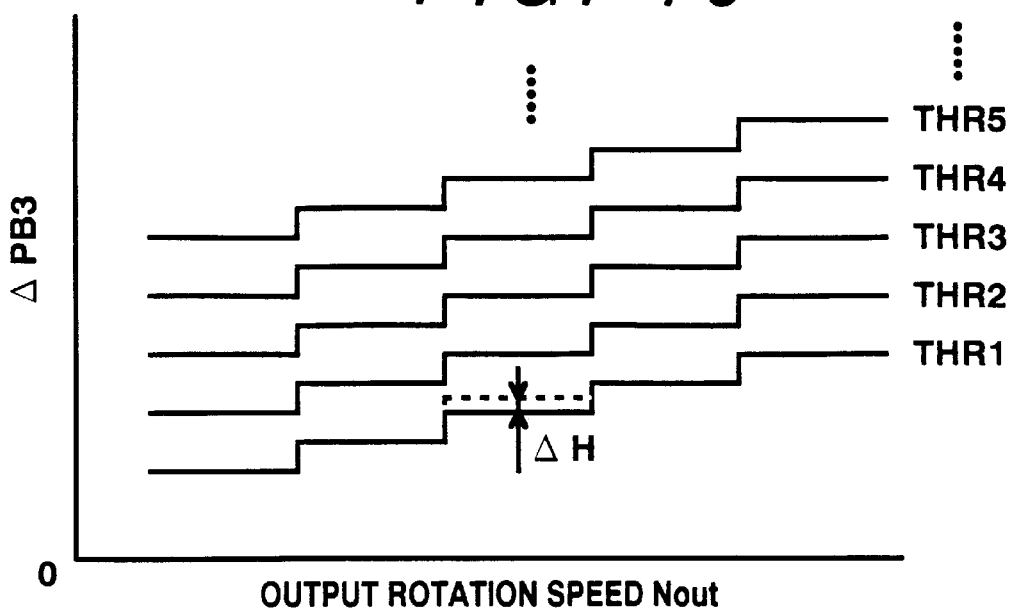
FIG. 10 is a chart of a synchronizing pressure map for a B-3 pressure in the control system.

This setting is described with reference to FIG. 4. FIG. 4 is a chart that shows the hydraulic pressure needed to engage the band brake at a predetermined output rotation speed. As shown in FIG. 4, the hydraulic pressure, which is needed to completely stop the rotational element at the rotation in the self-energy direction as shown with a solid line, is lower than the pressure, which is needed at the rotation in the de-energy direction as shown with a solid line. As a result, the reverse rotation of the rotational element is able to be stopped by the hydraulic pressure needed for stopping the rotation in the self-energy direction as a one-way clutch. However, in case that the hydraulic pressure is set as shown with a dotted line wherein a certain engine racing occurs at the end of the shift, the steep brake engagement at the reverse rotation of the rotational element is prevented so that the smooth shift is performed. In effect, it is very complicated to calculate the input torque and the inertia torque at the engagement of the brake, that is, at shift end. Therefore, in this embodiment, an easy control is performed by storing a data, which sets a relation between an output rotation speed Nout and a waiting pressure value APB3 with a throttle opening THR as a parameter, as shown in a B-3 pressure synchronization pressure map for the 5–2 shift as shown in FIG. 10 discussed below.

Figure 5:
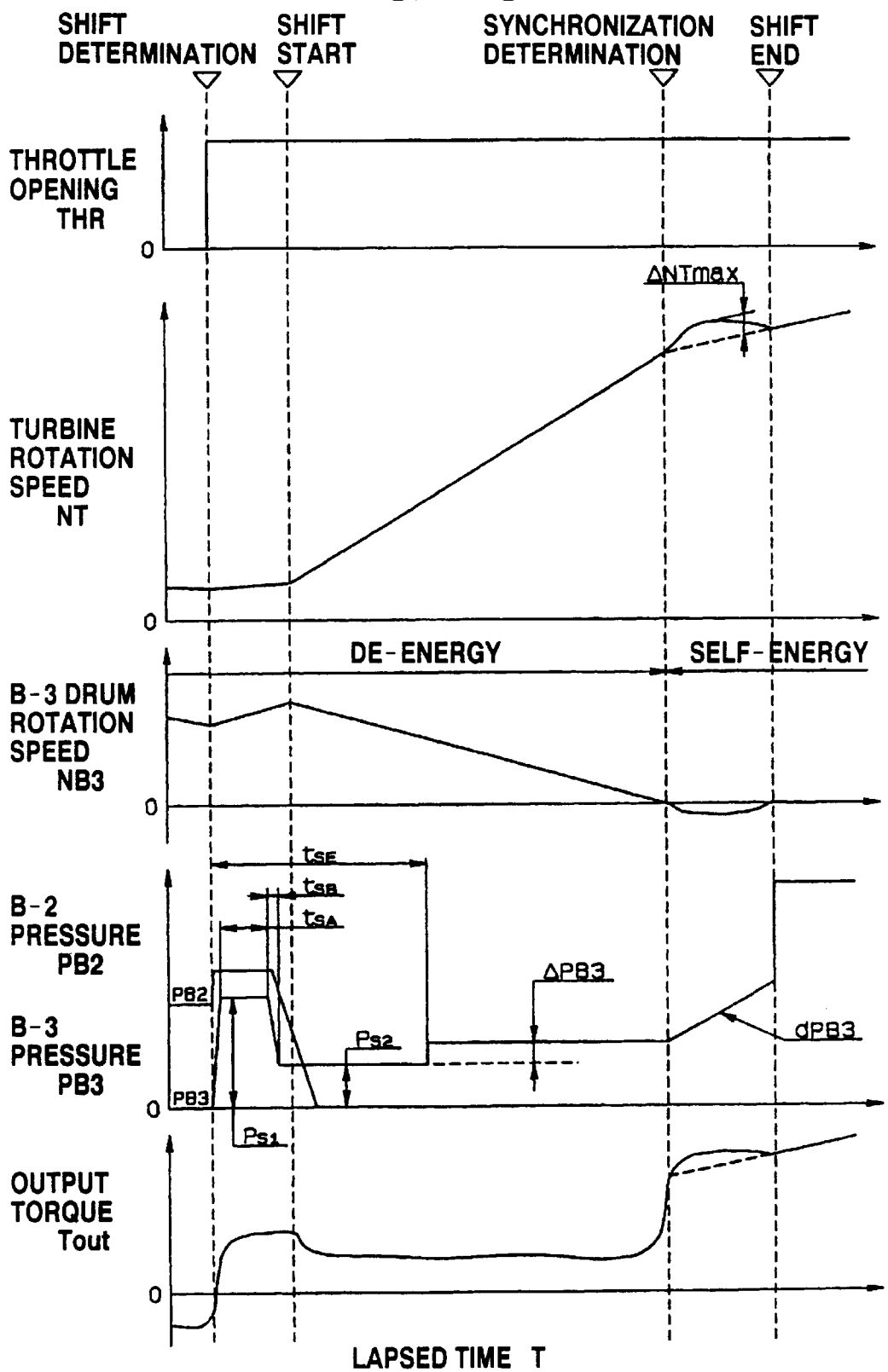
FIG. 5 is a time chart for a shift control of the first embodiment.

An apparatus that performs the control includes a program stored in the electronic control system 6. The control performed by the program will be conceptually described with reference to a time chart. FIG. 5 shows the time chart for a 5–2 shift control which is an example of a down shift. In this case, at first, a B-2 pressure PB2 applied to the hydraulic servo of the brake B-2 is an engagement pressure according to the input torque, and a B-3 pressure PB3 applied to the hydraulic servo of the brake B-3 is zero which means a releasing state. A turbine rotation speed NT is a low rotation speed synchronized with the rotation of the fifth gear stage. The throttle opening THR is zero which means a throttle off state. An output torque Tout is a negative value which means an engine coasting state. A B-3 drum rotation speed NB3 is in an idle running state, and the direction of the rotation is the de-energy direction.

When the throttle opening THR is increased by, for example, a kick-down, the control is started based on the 5–2 shift determination by the electronic control system 6. The B-2 pressure PB2 is increased to a high value by an increase of a throttle pressure due to the increase of the throttle opening so that the engagement of the brake B-2 is maintained according to the increase of the torque. Then, the high value is maintained for a predetermined time by a timer control so that the engine racing due to the under lap of the both brakes B-2 and B-3 is prevented. In this case, the output torque Tout changes to a positive value because the engine state changes to the engine drive state. The B-3 pressure PB3 increases to a first fill pressure $P_{S1}$ to fill the clearance of the hydraulic servo piston and maintained at the value for a predetermined time $t_{SA}$.

When the predetermined time $t_{SA}$ to fill the clearance has elapsed, the B-3 pressure PB3 is reduced to a stroke pressure $P_{S2}$ at a predetermined rate. Then, the B-3 pressure PB3 is maintained at the stroke pressure $P_{S2}$ until a predetermined time $t_{SE}$ has elapsed. The B-2 pressure PB2 is drained at a predetermined rate after elapsing the predetermined time $t_{SA}$. According to the start of the actual shift due to the drain of the B-2 pressure PB2, the turbine rotation speed NT as the input rotation speed increases to the neutral rotation speed, and the B-3 drum rotation speed NB3 reduces because of the reverse of the reaction force.

When the predetermined time $t_{SE}$ has elapsed, the B-3 pressure PB3 increases for an amount of the waiting pressure value ΔPB3, and the B-3 pressure PB3 is maintained at the value. In this state, the shift proceeds. Then, when the synchronization is determined, the B-3 pressure PB3 increases at a predetermined rate dPB3. At that time, the B-3 drum rotation speed reduces to zero and starts the reverse rotation immediately. However, the brake B-3 is not engaged immediately because the engagement force of the band is lacked due to the low hydraulic pressure setting of the hydraulic control. Therefore, the turbine rotation speed NT is raced for a certain amount comparing with the synchronizing rotation of the second gear stage as shown with a dotted line, after that, the turbine rotation speed NT reduces gradually, then, achieves to the synchronizing rotation at the shift end.

The difference between the turbine rotation speed NT at the synchronizing rotation and the turbine rotation speed NT at starting to reduce is defined to be a maximum turbine racing amount (ΔNTmax). In this term, the B-3 drum rotates with a certain speed in the self-energy direction, then, the B-3 drum rotation speed gradually reduces to zero, which means the stopping state, at the shift end by the increase of the engagement force of the band due to the sweep-up of the B-3 pressure PB3. At that time, the B-3 pressure PB3 immediately increases to the line pressure to ensure the maintenance of the engagement state, then, the shift is ended.

Figure 6:
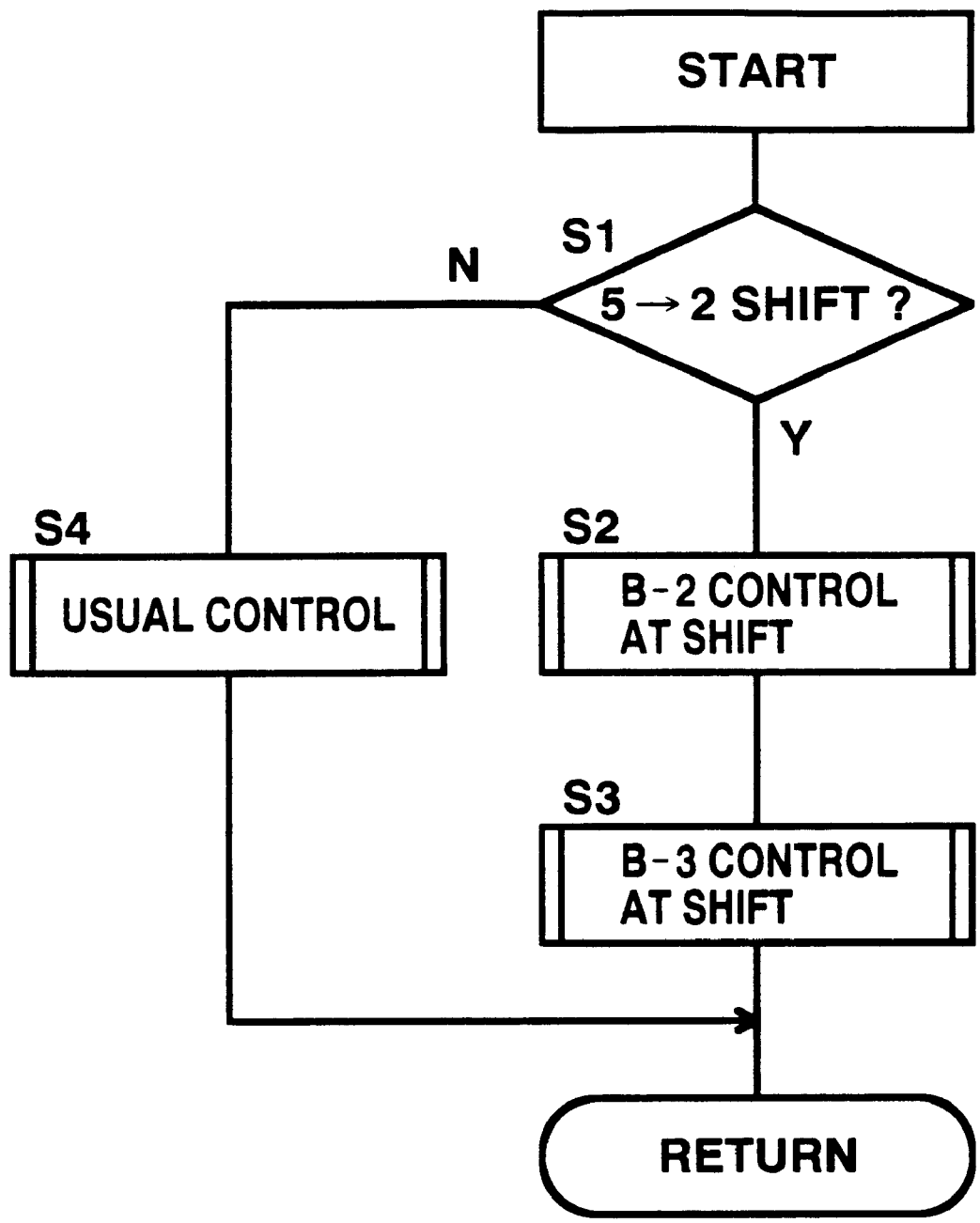
FIG. 6 is a main flowchart for the shift control by the control system.

FIG. 6 is a main flowchart of the hydraulic control process performed in the electronic control system 6 to perform the aforementioned control at the 5–2 downshift. In this flowchart, the control is divided to a control at shift and a usual control by the determination of the 5–2 shift. At step S1, it is determined whether the 5–2 shift is determined. When the 5–2 shift is not determined, the usual control is performed at step S4. When the 5–2 shift is determined, the subroutine for the B-2 control at shift is performed at step S2, and the subroutine for the B-3 control at shift is performed at step S3.

Figure 7:
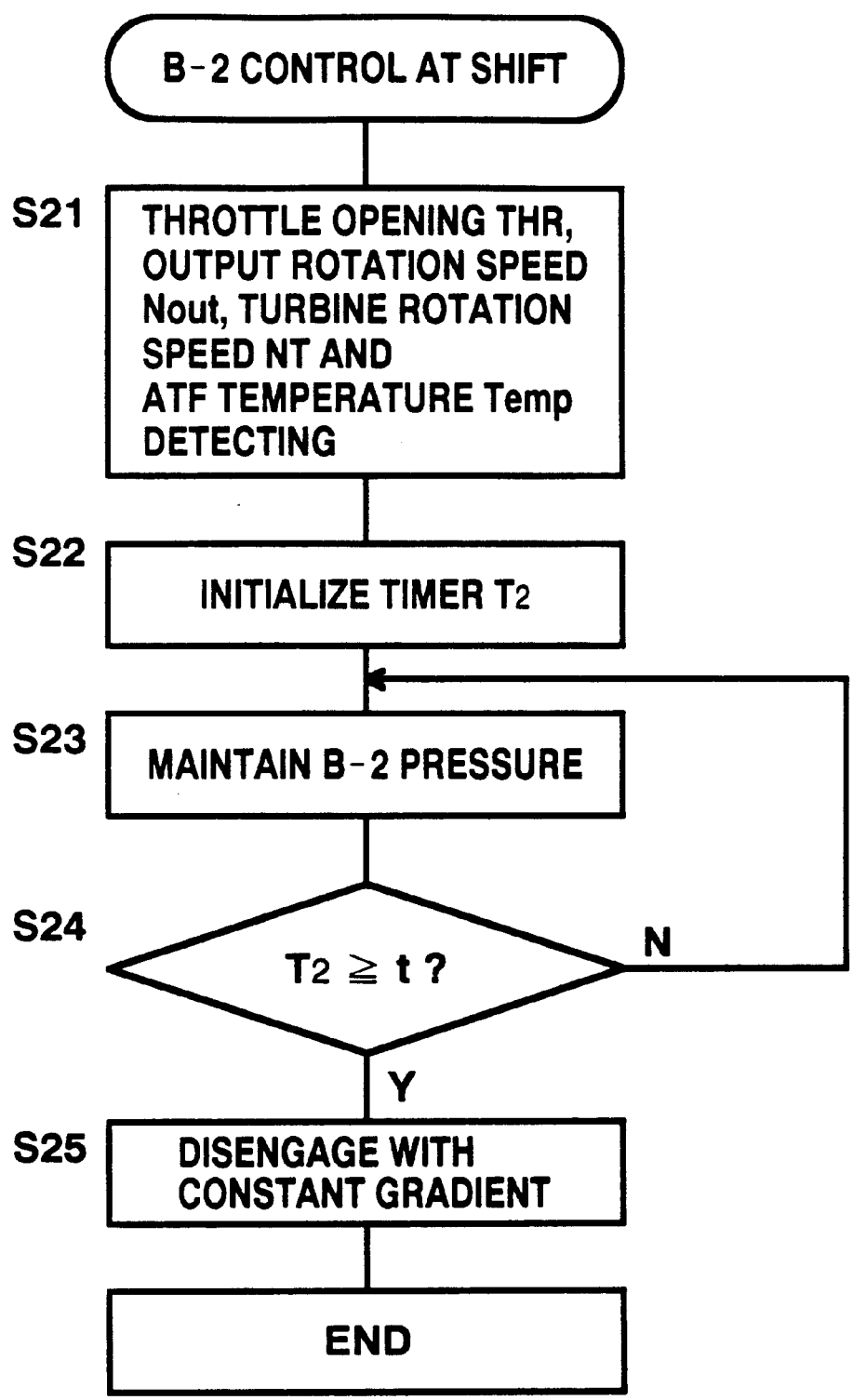
FIG. 7 is a flowchart for a subroutine of a B-2 control during the shift by the control system.

FIG. 7 shows details of the B-2 control at shift of the brake B-2 which is disengaged. At step S21, the throttle opening THR, the output rotation speed Nout, the turbine rotation speed NT and the ATF temperature Temp are detected by the outputs from the aforementioned sensors respectively. At step 22, a timer $T_2$ that maintains the B-2 pressure PB2 for the predetermined time is initialized. At step S23, the B-2 pressure PB2 is maintained. At step S24, the elapse of the timer $T_2$ is waited ($T_2 \geq t$, t: constant time). After elapsing the timer $T_2$, at step S25, the B-2 pressure PB2 reduces at the predetermined rate, then, the process is ended.

Figure 8:
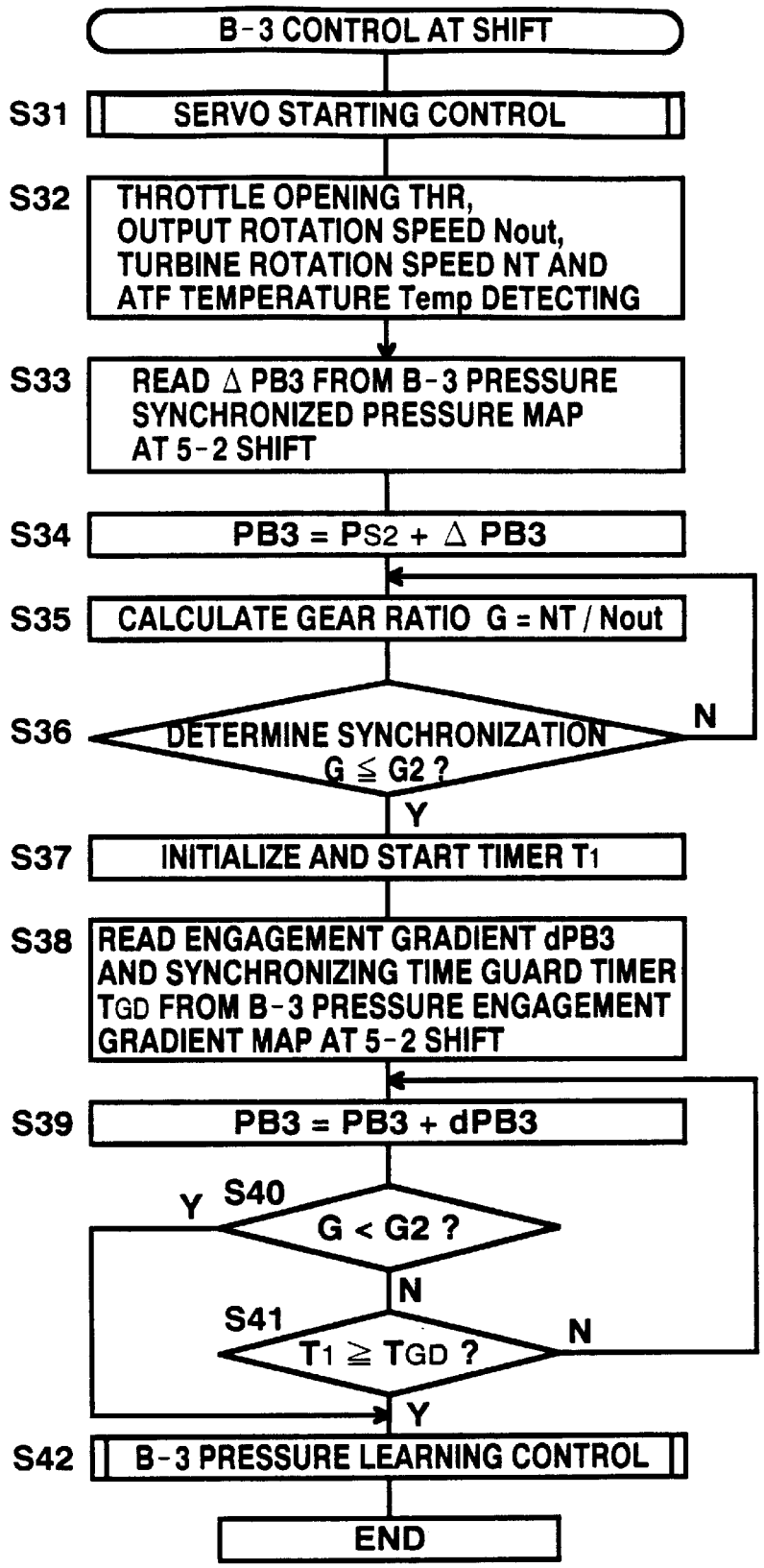
FIG. 8 is a flowchart for a subroutine of a B-3 control during the shift by the control system.
Figure 9:
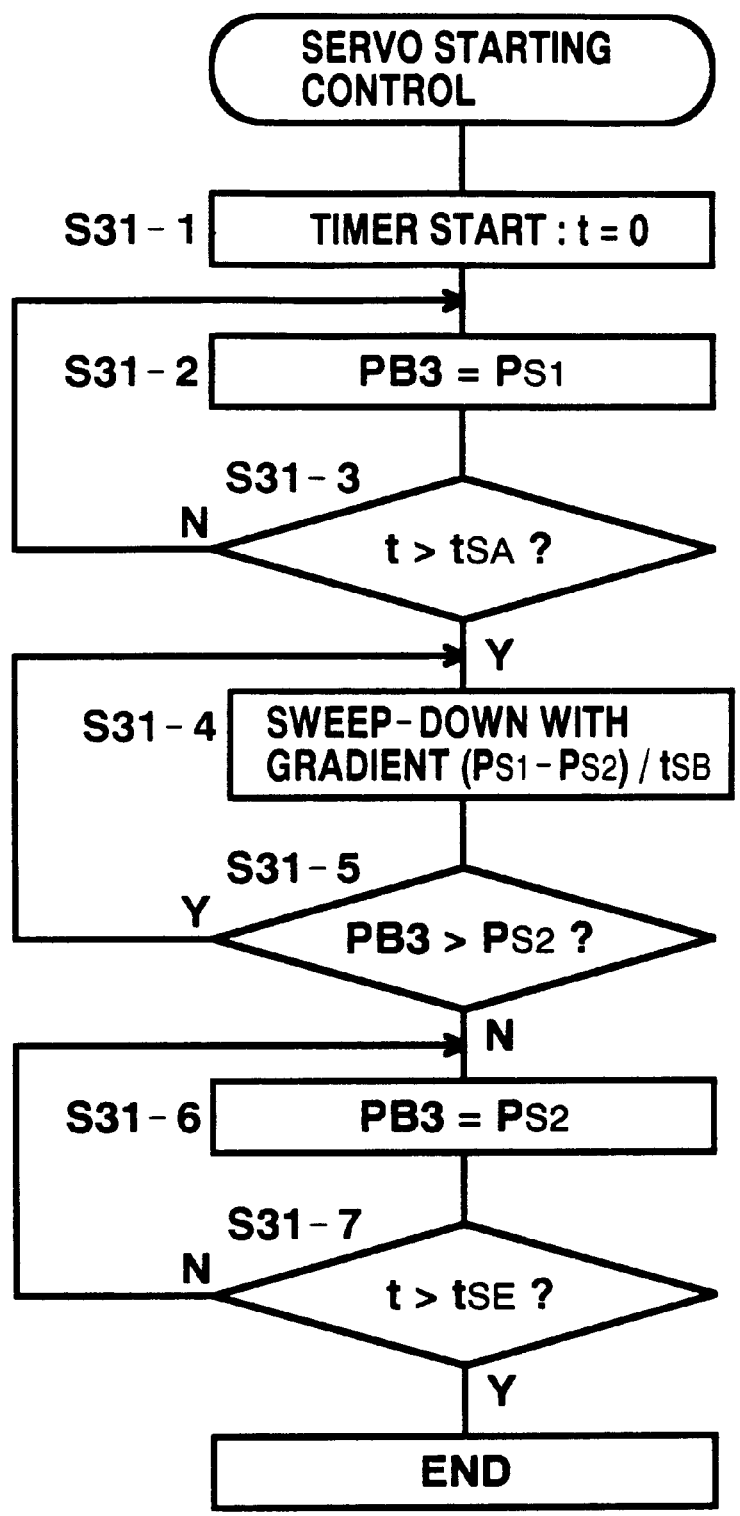
FIG. 9 is a flowchart for a subroutine of a servo starting control in the control system.

Regarding the brake B-3 which is engaged, the B-3 control at shift shown in FIG. 8 is performed. In this control, at step S31, a servo starting control is performed. This starting control is shown in FIG. 9. At step S31-1, a timer for the timer control is started (t=0). At step S31-2, the process, in which the application pressure PB3 is set to be the first fill pressure $P_{S1}$ to fill the invalid stroke of the piston, is performed. In detail, the output to the linear solenoid valve 55 shown in FIG. 1 is set to be a duty ratio with which the output pressure from the B-3 control valve 52 achieves to the first fill pressure $P_{S1}$. At step S31-3, it is determined whether the timer t has elapsed the predetermined time $t_{SA}$. When the timer t has elapsed the predetermined time $t_{SA}$, at step S31-4, the application pressure PB3 reduces at the predetermined rate ($P_{S1}$–$P_{S2}$)/$t_{SB}$. This process continues until the application pressure PB3 reduces to lower than the stroke pressure $P_{S2}$ at step S31-5. When the application pressure PB3 reduces to lower than the stroke pressure $P_{S2}$, at step S31-6, the application pressure PB3 is maintained at the stroke pressure $P_{S2}$. This state continues until the timer t has elapsed the predetermined time $t_{SE}$ (t>$t_{SE}$) at step S31-7. Then, the servo starting control is ended.

Returning to FIG. 8, after the servo starting control, at step S32, the throttle opening THR, the output rotation speed Nout, the turbine rotation speed NT, and the ATF temperature Temp are detected. At step S33, the waiting pressure value ΔPB3 is read from the synchronizing pressure map for the B-3 pressure at the 5–2 shift. FIG. 10 shows the synchronizing pressure map for the B-3 pressure at the 5–2 shift. In this map, the waiting pressure value ΔPB3 is defined with the relation to the output rotation speed Nout and with the throttle opening THR as the parameter.

As shown in FIG. 10, when the throttle opening THR reflecting the input torque increases, the waiting pressure value ΔPB3 increases. In this map, the input torque is presumed based on the throttle opening THR and the vehicle speed, that is, the output rotation speed Nout, and the inertia torque is presumed based on the output rotation speed Nout. Therefore, the map corresponds to the change of the input torque and the inertia torque. It notes that it is better that the multiple maps corresponding to the ATF temperature Temp are prepared and the multiple maps are set so that the waiting pressure value ΔPB3 increases when the ATF temperature Temp reduces in case the μ-characteristic reduces when the ATF temperature Temp reduces. Further, it is better that the maps are set properly corresponding to the materials of the frictional engagement element because the change of the μ-characteristics corresponding to the ATF temperature Temp are different depending upon the material.

Returning to FIG. 8, at step S34, the application pressure PB3 is set based on the waiting pressure value ΔPB3 and the stroke pressure $P_{S2}$ and outputted as the waiting pressure. At step S35, the gear ratio G is calculated by dividing the turbine rotation speed NT by the output rotation speed Nout. At step S36, the second gear stage synchronization is determined based on whether the calculated gear ratio G reduces to the gear ratio G2 of the second gear stage (G≦G2). When the synchronization is determined, at step S37, a timer $T_1$ is initialized and started. At step S38, the engagement rate dPB is read from an engagement rate map for the B-3 pressure at the 5–2 shift shown in FIG. 11, and a synchronizing time guard timer $T_{GD}$ is read from a map shown in FIG. 12.

Figure 11:
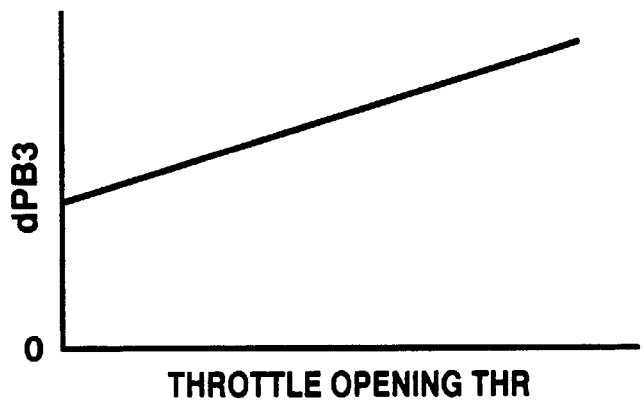
FIG. 11 is a chart of an engagement gradient map for a B-3 pressure in the control system.

FIG. 11 shows the engagement rate map for the B-3 pressure at the 5–2 shift. According to this map, the engagement rate dPB is made to be large when the throttle opening, that is, the input torque is large so that the extension of the shift time is prevented, and the engagement rate dPB is made to be small when the throttle opening is low so that the shift shock is prevented.

Figure 12:
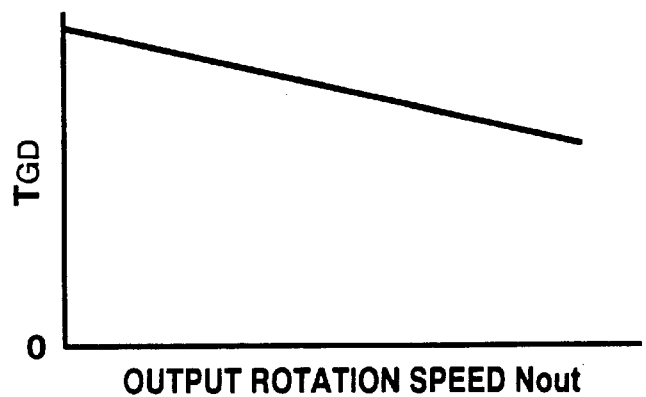
FIG. 12 is a chart of a synchronized time guard timer map in the control system.

FIG. 12 shows the map of the synchronizing time guard timer to prevent the baking of the frictional element because of the long shift time. At step S39, the engagement rate thus obtained is added to the current application pressure PB3 and the renewed application pressure PB3 is outputted. At step S40, the synchronization is determined (G<G2). When the synchronization is determined, at step S42, a B-3 pressure learning control is performed. In case the synchronization is not determined until the timer $T_1$ has elapsed the guard timer $T_{GD}$, after the determination of that the timer $T_1$ has elapsed the guard timer $T_{GD}$ at step S41, the B-3 pressure learning control is performed at step S42.

Figure 13:
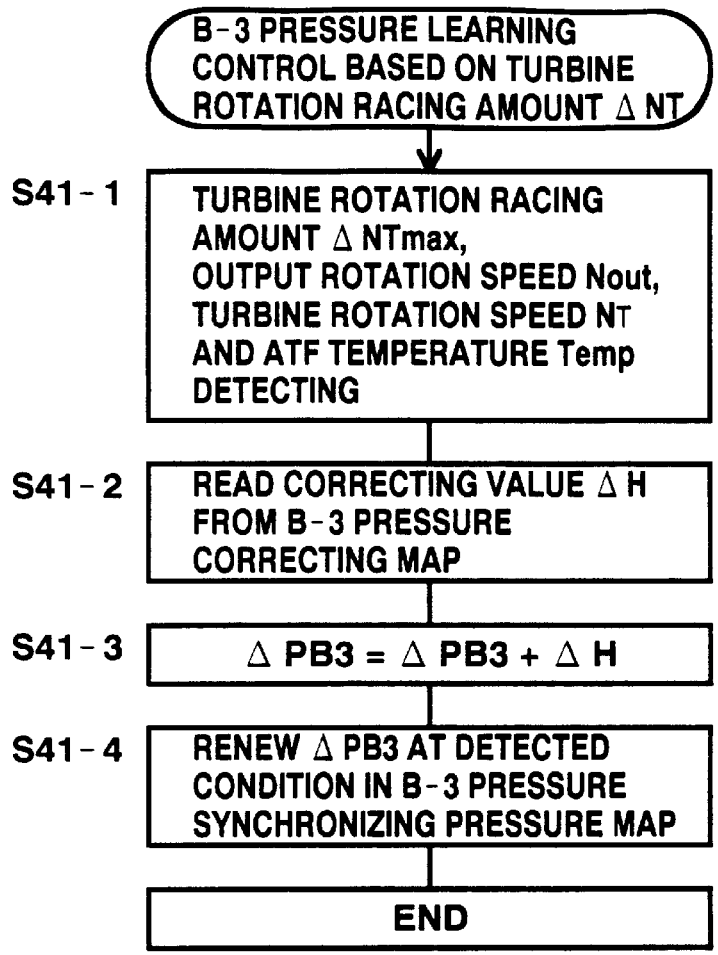
FIG. 13 is a flowchart for a subroutine of a B-3 pressure learning control in the control system.

FIG. 13 shows the detail of the B-3 pressure learning control. At step S41-1, the turbine rotation maximum racing amount ΔNTmax, the output rotation speed Nout, the turbine rotation speed $N_T$, and the ATF temperature Temp are detected. The turbine rotation maximum racing amount ΔNTmax is the maximum value of the difference between the actual input rotation speed and the synchronizing input rotation speed, which is calculated based on the output rotation speed Nout and the gear ratio, at the low speed gear stage. At step S41-2, a correcting value ΔH is read with reference to a B-3 pressure correcting map shown in FIG. 14. At step S41-3, the waiting pressure value ΔPB3 is renewed by adding the correcting value ΔH and outputted. At step S41-4, the waiting pressure value ΔPB3 of the detected condition in the B-3 pressure correcting map is renewed as shown with a dotted line in FIG. 10.

Figure 14:
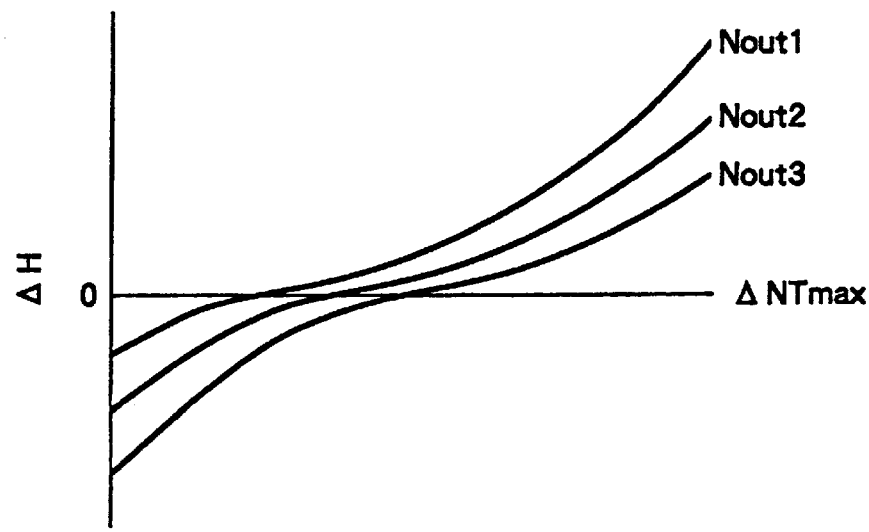
FIG. 14 is a chart of a B-3 pressure correction map in the control system.

FIG. 14 shows the B-3 pressure correcting map. In this map, a point crossing with a line of zero of the correcting value ΔH is the basis of the turbine rotation maximum racing amount ΔNTmax. When the racing amount is larger than the basis, the hydraulic pressure increases to prevent the extension of the shift time. When the racing amount is smaller than the basis, the hydraulic pressure reduces to prevent the shift shock. In case the basis is set to be constant irrespective of the vehicle speed, that is, the output rotation speed Nout, the racing feel increases at the low vehicle speed because whole rotation change rate at the shift in the low vehicle speed is smaller than the rate in the high vehicle speed. Therefore, the basis is needed to set in order that the basis reduces when the vehicle speed reduces to prevent the large racing feel. Therefore, in this map, the correcting value ΔH increases when the vehicle speed reduces in the region larger than the basis.

In the process performed by the electronic control system 6, in the hydraulic circuit shown in FIG. 1, a solenoid pressure, which is modulated from a modulator pressure Pm at the linear solenoid valve 55, is applied to an end of a spool of a B-3 control valve 52. The B-3 control valve 52 modulates the line pressure $P_L$ to the waiting pressure (PB3=$P_{S2}$+ΔPB3) with the balance between a return spring load against the force of the solenoid pressure and a feedback pressure. Then, the application pressure PB3 maintained at the constant waiting pressure is applied to the large diameter bore $S_L$ of the hydraulic servo 4. The large diameter piston 44 is slid and the rod 42 is pushed by the application of the constant waiting pressure. Then, the rod 42 pushes the bracket 34 at the end. At that time, the band 32 supported by the anchor pin 35 at the end is engaged with the drum 31. However, in a state before the synchronization of the second gear stage in which the reaction force operated to the drum 31 in the engagement state operates in the de-energizing direction, the rotation speed reduces but the drum 31 continues to rotate because the engagement force of the band 32 is lacked. After that, the rotation speed of the drum 31 reduced to zero when the synchronizing point of the second gear stage is achieved. However, at that time, the engagement force of the band 32 is lacked because the application pressure is the waiting pressure PB3=$P_{S2}$+ΔPB3. Therefore, the drum 31 rotates in the reverse direction. After that, the application pressure PB3 is increased at the predetermined rate dPB3 by the electronic control system 6. Therefore, the application pressure PB3 increases to a hydraulic pressure with which the rotation in the self-energizing direction is stopped. As a result, the rotation of the drum 31 is stopped from rotating.

In this embodiment, when the sun gear s3 is engaged to establish the second gear stage, the hydraulic pressure, which is needed to stop the rotation of the sun gear s3 rotating in the de-energizing direction, is higher than the hydraulic pressure in case of the self-energizing direction. The self-energizing direction is set to be the same with the direction in which the drum 31 rotates by the reaction force to the sun gear s3 occurred at establishing the low speed gear stage. The hydraulic pressure, with which only the rotation in the self-energizing direction is stopped, is applied from the synchronization of the fifth speed gear stage. Therefore, the rotational direction of the drum 31, which is in the de-energizing direction at establishing the high speed gear stage, changes to the self-energizing direction at establishing the low speed gear stage, then, the second gear stage is established by engaging the sun gear s3 which is engaged by the band brake B-3 with the self-energizing operation. In case that the hydraulic pressure, with which the drum 31 is stopped immediately at the synchronizing point, is applied, the shift shock increases because of the stop of the rotation of the sun gear s3 at the synchronizing point. Therefore, in this embodiment, the reverse rotation of the sun gear s3 is stopped gradually after the reverse rotation occurs which occurs after the synchronizing point.

Figure 15:
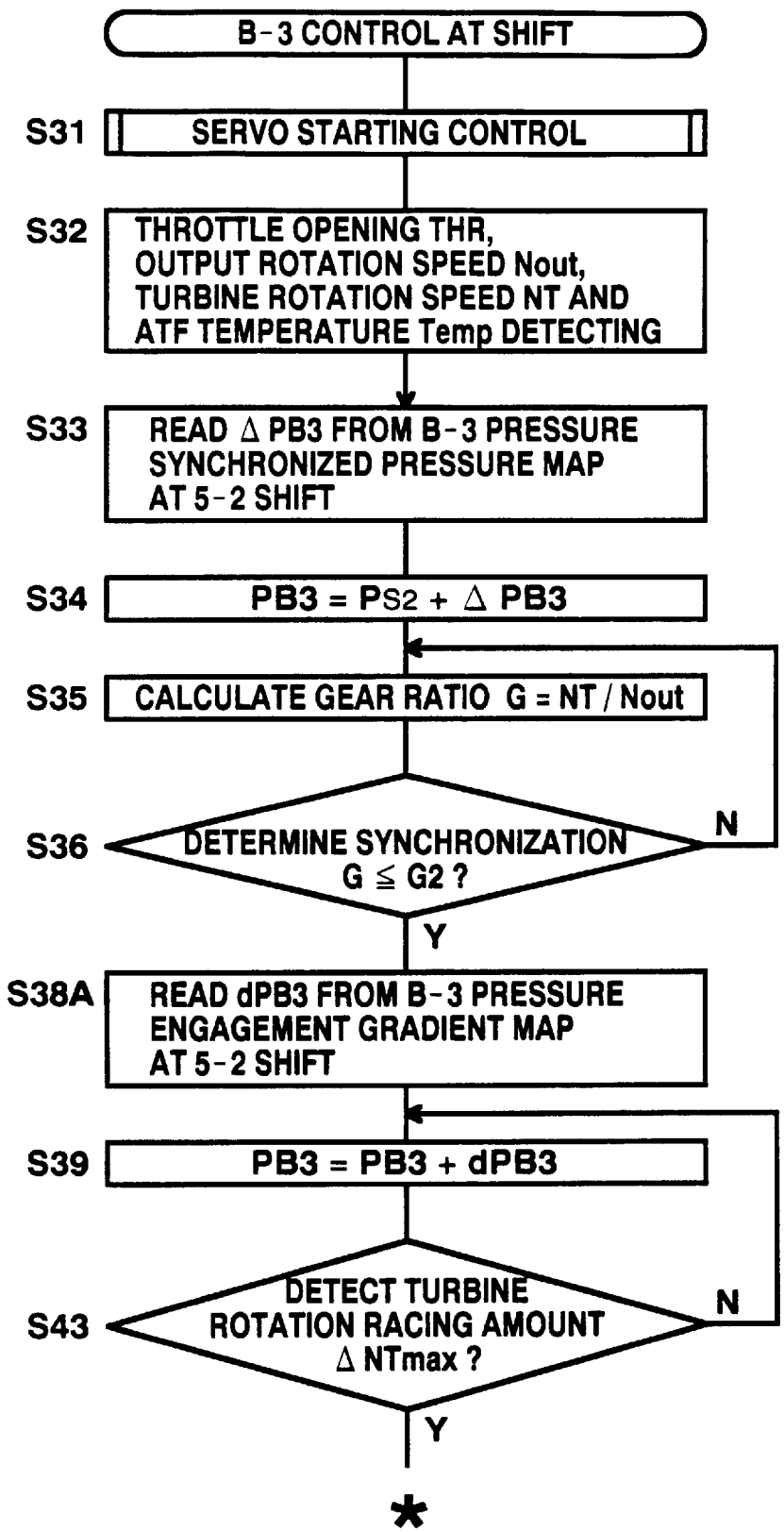
FIG. 15 is a flowchart for the first half of a subroutine of a shift time B-3 control in a shift control of the second embodiment.
Figure 16:
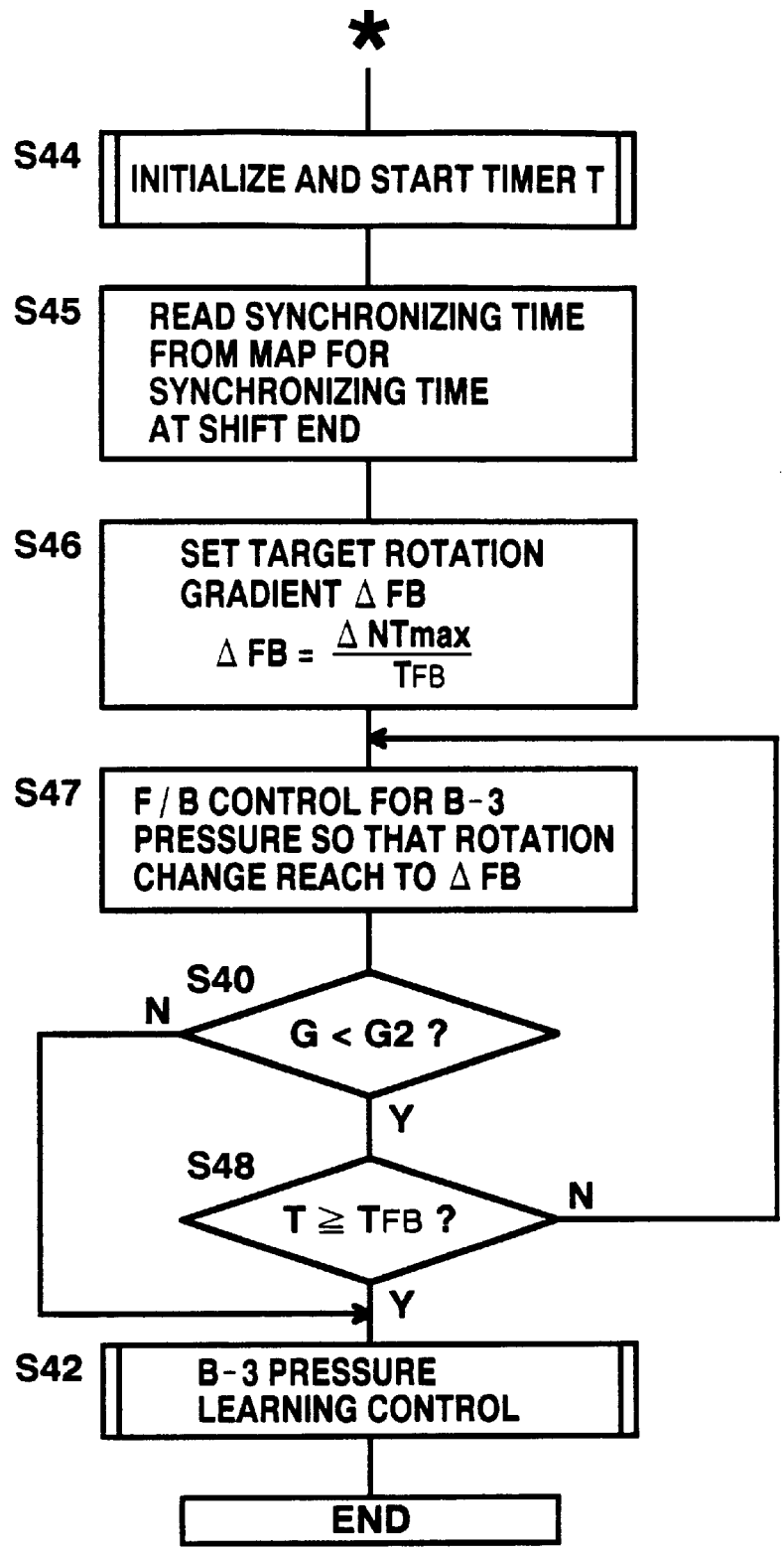
FIG. 16 is a flowchart for the last half of a subroutine of a shift time B-3 control.

FIG. 15 and FIG. 16 show a control flowchart of the second embodiment of the invention. This embodiment is different from the first embodiment such that a feedback control is performed at the latter of the sweep-up of the B-3 pressure. Therefore, the features in common with the first embodiment are not described and the same step numbers are used. Only the different control features will be described. In this feedback control, after determining the synchronization at step S36 shown in FIG. 15, without initializing and starting the timer $T_1$, the engagement gradient pressure dPB3 is read from the map at step S38A, and the sweep-up of the B-3 pressure is performed at the rate of the engagement gradient pressure dPB3 at step S39. Then, at step S43, the turbine rotation maximum racing amount ΔNTmax is detected.

As shown in FIG. 16, at step S44, a timer T is initialized and started. At step S45, a synchronizing time $T_{FB}$ is read from a map for a synchronizing time at the shift end.

Figure 17:
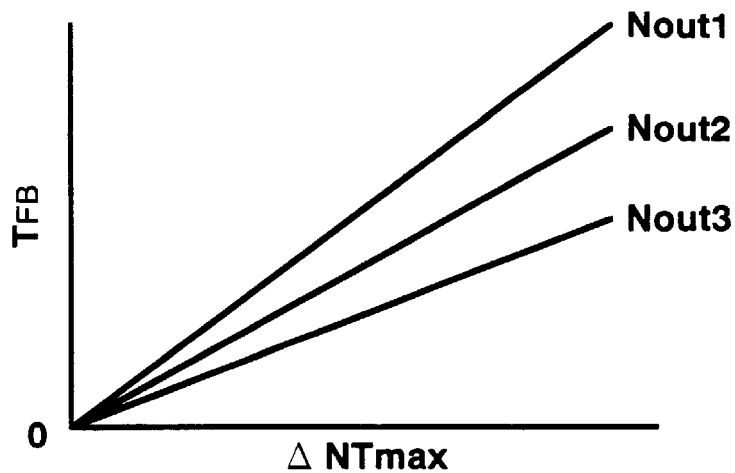
FIG. 17 is a shift end time synchronized time map in the control system of the second embodiment.

FIG. 17 shows the map for the synchronizing time at the shift end. As shown in FIG. 17, the shift time increases when the turbine rotation maximum racing amount ΔNTmax increases in order to prevent the shift shock by a steep rotation change. A rate of the turbine rotation maximum racing amount ΔNTmax to the whole rotation change amount in the shift in low vehicle speed is higher than the case of high vehicle speed. Therefore, the shift time is lengthened when the output rotation speed reduces in order to prevent the steep rotation change to the whole rotation in the shift.

Returning to FIG. 16, at step S46, a target rotation change ΔFB is set. The target rotation change ΔFB is calculated by dividing the turbine rotation maximum racing amount ΔNTmax with the synchronizing time $T_{FB}$. At step S47, the feedback control for the B-3 pressure PB3 is performed so that the actual rotation change achieves to the target rotation change ΔFB. Step 40 is same step as the first embodiment. At step S48, it is determined whether the timer T has elapsed the synchronizing time $T_{FB}$. Step 42 is same step as the first embodiment.

Figure 18:
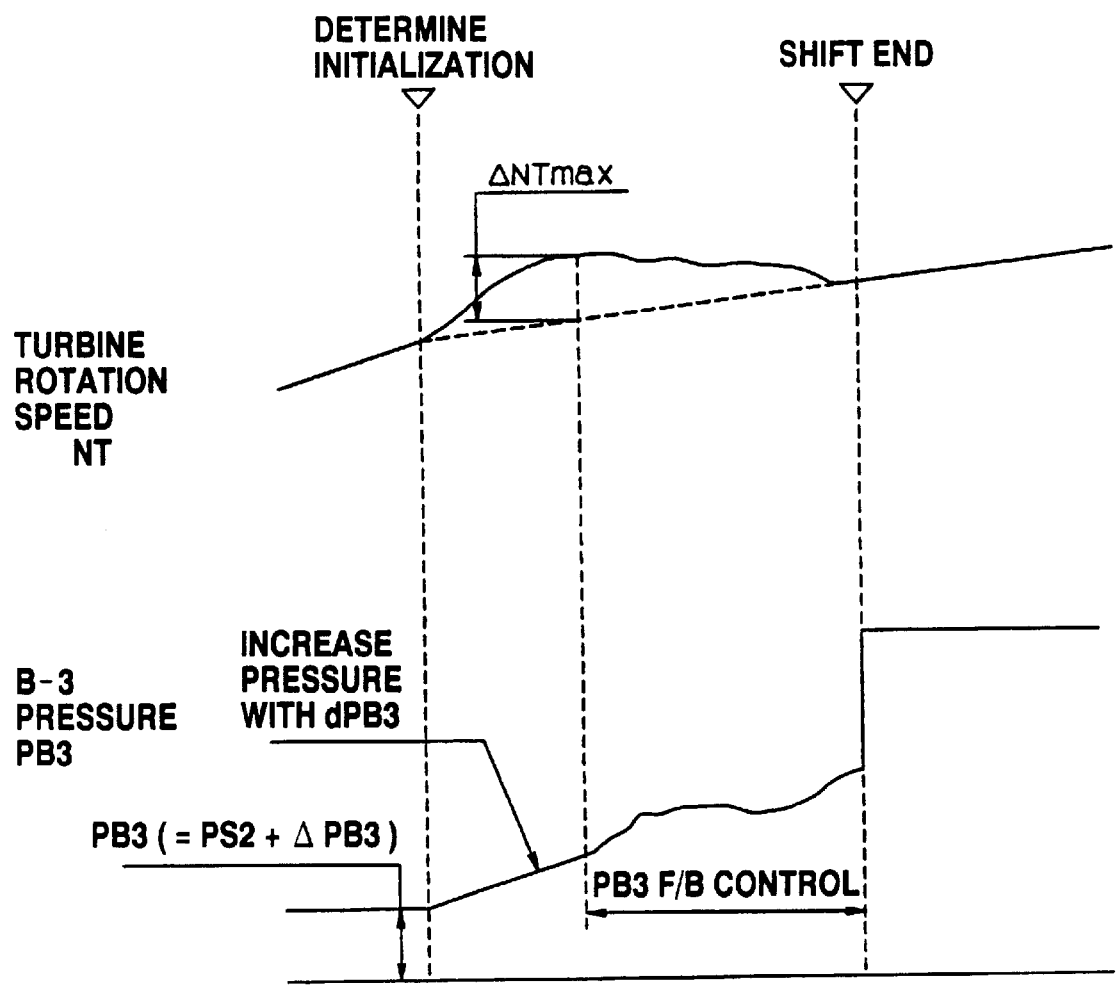
FIG. 18 is a time chart of the last half of the shift in the control system of the second embodiment.

FIG. 18 shows a time chart after determining the synchronization of the second embodiment. When the turbine rotation maximum racing amount ΔNTmax is detected, the feedback control starts. Therefore, the B-3 pressure PB3 is controlled based on the feedback value.

The control of the second embodiment is complicated in comparison with the control of the first embodiment. However, the steep rotation change to the whole rotation change in the shift is prevented, then, the shift shock is more certainly prevented by setting the gradient to reduce when the output rotation speed reduces corresponding to that a rate of the turbine rotation maximum racing amount ΔNTmax to the whole rotation change amount in the shift in the low vehicle speed which is higher than the case of the high vehicle speed.

The invention should not be limited to the foregoing embodiments but can be modified in various manners based on its gist, and these modifications should not be excluded from the scope of the invention.

What is claimed is:

1. A control system for an automatic transmission that has a high speed gear stage, a low speed gear stage, and an input rotation, comprising:
    a frictional engagement element engageable to establish the high speed gear stage;
    a rotational element that can be stopped from rotating with a brake to establish the low speed gear stage, a rotational direction of the rotational element when the high speed gear stage has been established being opposite to a direction of torque to the rotational element created when the rotational element is stopped from rotating to establish the low speed gear stage; and
    a control unit that controls hydraulic pressures applied to the frictional engagement element and the brake, wherein:
        the brake is formed of a band brake which has a difference of engagement force between a self-energizing operation and a de-energizing operation, and includes a hydraulic servo;
        the band brake is set so that a direction of the self-energizing operation is the same as the direction of the torque to the rotational element created when the rotational element is stopped from rotating to establish the low speed gear stage, and in order to provide a region in which a hydraulic pressure, which is needed to engage the rotational element when the low speed gear stage is established, is lower than a hydraulic pressure, which is needed to engage the rotational element when the rotational element is stopped from rotating in the direction of the de-energizing operation, the region being an operational range such that the band brake is set so as to include the operational range; and
        the control unit includes a disengaging device which disengages the frictional engagement element at a downshift from the high speed gear stage to the low speed gear stage, a synchronization determining device which determines that the input rotation of the automatic transmission is synchronized with the rotation at the low speed gear stage, a constant pressure maintaining device which maintains the hydraulic pressure applied to the hydraulic servo of the band brake with a waiting pressure, which is lower by a predetermined amount than a pressure stopping the rotation of the rotational element in the direction of the self-energizing operation and with which the input rotation is raced by a basic racing amount after a synchronizing point, until the synchronization is determined by the synchronization determining device, and a pressure increasing device which increases the hydraulic pressure applied to the hydraulic servo from the waiting pressure in order to stop the rotational element from rotating after determining the synchronization.

2. The control system for an automatic transmission according to claim 1, wherein the pressure increasing device increases the hydraulic pressure with a predetermined rate, which increases when a throttle opening of an engine increases, after determining the synchronization.

3. The control system for an automatic transmission according to claim 1, wherein the pressure increasing device increases the hydraulic pressure at a predetermined rate, and controls the hydraulic pressure in order that the input rotation speed changes at a target rate which reduces when the output rotation speed of the automatic transmission reduces.

4. The control system for an automatic transmission according to claim 1, wherein the control unit stores a premeditated waiting pressure value for the basic racing amount to occur, and includes a maximum racing amount detecting device that detects a maximum racing amount of the input rotation speed based on the input rotation speed of the automatic transmission, and further includes a learning device which renews the stored waiting pressure value in order to achieve the basic racing amount by comparing the basic racing amount with the maximum racing amount after the end of the downshift.

5. The control system for an automatic transmission according to claim 4, wherein the pressure increasing device increases the hydraulic pressure with a predetermined rate, which increases when the throttle opening of the engine increases, after determining the synchronization.

6. The control system for an automatic transmission according to claim 4, wherein the pressure increasing device increases the hydraulic pressure at a predetermined rate and control the hydraulic pressure in order that the input rotation speed changes at a target rate which reduces when the output rotation speed of the automatic transmission reduces.

7. The control system for an automatic transmission according to claim 4, wherein multiple waiting pressure values are stored in the control unit, and correspond to a throttle opening of an engine and an output rotation speed as parameters, and the waiting pressure value is selected corresponding to the throttle opening and the output rotation speed at a shift start.

8. The control system for an automatic transmission according to claim 7, wherein the pressure increasing device increases the hydraulic pressure with a predetermined rate, which increases when the throttle opening of the engine increases, after determining the synchronization.

9. The control system for an automatic transmission according to claim 7, wherein the pressure increasing device increases the hydraulic pressure at a predetermined rate, and controls the hydraulic pressure in order that the input rotation speed changes at a target rate which reduces when the output rotation speed of the automatic transmission reduces.

10. The control system for an automatic transmission according to claim 1, wherein multiple waiting pressure values are stored in the control unit, and correspond to a throttle opening of an engine and an output rotation speed as parameters, and the waiting pressure value is selected corresponding to the throttle opening and the output rotation speed at a shift start.

11. The control system for an automatic transmission according to claim 10, wherein the pressure increasing device increases the hydraulic pressure with a predetermined rate, which increases when the throttle opening of the engine increases, after determining the synchronization.

12. The control system for an automatic transmission according to claim 10, wherein the pressure increasing device increases the hydraulic pressure at a predetermined rate, and controls the hydraulic pressure in order that the input rotation speed changes at a target rate which reduces when the output rotation speed of the automatic transmission reduces.

13. A method of controlling an automatic transmission that includes:
- a frictional engagement element engageable to establish a high speed gear stage; and
- a rotational element that can be stopped from rotating with a brake to establish a low speed gear stage, a rotational direction of the rotational element when the high speed gear stage has been established being opposite to a direction of torque to the rotational element created when the rotational element is stopped from rotating to establish the low speed gear stage;
- wherein the brake is formed of a band brake which has a difference of engagement force between a self-energizing operation and a de-energizing operation, and includes a hydraulic servo;
- the band brake is set so that a direction of the self-energizing operation is the same as the direction of the torque to the rotational element created when the rotational element is stopped from rotating to establish the low speed gear stage, and in order to provide a region in which a hydraulic pressure, which is needed to engage the rotational element when the low speed gear stage is established, is lower than a hydraulic pressure, which is needed to engage the rotational element when the rotational element is stopped from rotating in the direction of the de-energizing operation, the region being an operational range such that the band brake is set so as to include the operational range; the method comprising the steps of:
- controlling hydraulic pressures applied to the frictional engagement element and the brake;
- disengaging the frictional engagement element at a downshift from the high speed gear stage to the low speed gear stage with a disengaging device;
- determining that the input rotation of the automatic transmission is synchronized with the rotation at the low speed gear stage with a synchronization determining device;
- maintaining with a constant pressure maintaining device the hydraulic pressure applied to the hydraulic servo of the band brake with a waiting pressure, which is lower by a predetermined amount than a pressure stopping the rotation of the rotational element in the direction of the self-energizing operation and with which the input rotation is raced by a basic racing amount after a synchronizing point, until the synchronization is determined by the synchronization determining device; and
- increasing with a pressure increasing device the hydraulic pressure applied to the hydraulic servo from the waiting pressure in order to stop the rotational element from rotating after determining the synchronization.

14. The method according to claim 13, further including the steps of:
- controlling a premeditated waiting pressure value for the basic racing amount to occur;
- detecting with a maximum racing amount detecting device a maximum racing amount of the input rotation speed based on the input rotation speed of the automatic transmission; and
- renewing with a learning device the stored waiting pressure value in order to achieve the basic racing amount by comparing the basic racing amount with the maximum racing amount after the end of the downshift.

15. A control system for an automatic transmission that has a high speed gear stage, a low speed gear stage, and an input rotation, comprising:
- a frictional engagement element engageable to establish the high speed gear stage;
- a rotational element that is stopped from rotating with a brake to establish the low speed gear stage, a rotational direction of the rotational element when the high speed gear stage has been established being opposite to a direction of torque to the rotational element created when the rotational element is stopped from rotating to establish the low speed gear stage; and
- a control unit that controls hydraulic pressures applied to the frictional engagement element and the brake, wherein:
  - the brake is formed of a band brake which has a difference of engagement force between a self-energizing operation and a de-energizing operation, and includes a hydraulic servo;
  - the band brake is set so that a direction of the self-energizing operation is the same as the direction of the torque to the rotational element created when the rotational element is stopped from rotating to establish the low speed gear stage, and in order to provide a region in which a hydraulic pressure, which is needed to engage the rotational element when the low speed gear stage is established, is lower than a hydraulic pressure, which is needed to engage the rotational element when the rotational element is stopped from rotating in the direction of the de-energizing operation, the region being an operational range such that the band brake is set so as to include the operational range; and
  - the control unit includes disengaging means for disengaging the frictional engagement element at a downshift from the high speed gear stage to the low speed gear stage, synchronization determining means for determining that the input rotation of the automatic transmission is synchronized with the rotation at the low speed gear stage, constant pressure maintaining means for maintaining the hydraulic pressure applied to the hydraulic servo of the band brake with a waiting pressure, which is lower by a predetermined amount than a pressure stopping the rotation of the rotational element in the direction of the self-energizing operation and with which the input rotation is raced by a basic racing amount after a synchronizing point, until the synchronization is determined by the synchronization determining means, and pressure increasing means for increasing the hydraulic pressure applied to the hydraulic servo from the waiting pressure in order to stop the rotational element from rotating after determining the synchronization.

16. The control system for an automatic transmission according to claim 15, wherein the control unit stores a premeditated waiting pressure value for the basic racing amount to occur, and includes maximum racing amount detecting means for detecting a maximum racing amount of the input rotation speed based on the input rotation speed of the automatic transmission, and further includes learning means for renewing the stored waiting pressure value in order to achieve the basic racing amount by comparing the basic racing amount with the maximum racing amount after the end of the downshift.

* * * * *